(12) United States Patent
Rosenberg et al.

(10) Patent No.: US 11,416,122 B2
(45) Date of Patent: Aug. 16, 2022

(54) LOCATION TEXT

(71) Applicant: Nokia Technologies Oy, Espoo (FI)

(72) Inventors: Robert F. Rosenberg, London (GB); Ana Amorim, London (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 1216 days.

(21) Appl. No.: 13/852,533

(22) Filed: Mar. 28, 2013

(65) Prior Publication Data

US 2013/0263040 A1 Oct. 3, 2013

(30) Foreign Application Priority Data

Mar. 29, 2012 (GB) ..................................... 1205560

(51) Int. Cl.
| | |
|---|---|
| *G06F 3/0484* | (2013.01) |
| *G06F 40/166* | (2020.01) |
| *G06F 16/9537* | (2019.01) |
| *G06F 40/274* | (2020.01) |

(52) U.S. Cl.
CPC ........ *G06F 3/0484* (2013.01); *G06F 16/9537* (2019.01); *G06F 40/166* (2020.01); *G06F 40/274* (2020.01)

(58) Field of Classification Search
CPC ............... G06F 17/15; G06F 17/30528; G06F 17/3087; G06F 2221/2111; G06F 3/04815; G01C 21/005; G01C 21/00; G01C 21/20; G01C 21/36; H04L 63/0492; H04L 67/306
See application file for complete search history.

(56) References Cited

U.S. PATENT DOCUMENTS

| | | | | |
|---|---|---|---|---|
| 6,549,768 | B1* | 4/2003 | Fraccaroli | H04W 4/029 |
| | | | | 455/456.3 |
| 7,562,113 | B2* | 7/2009 | Labarge | G06F 16/955 |
| | | | | 709/203 |
| 8,713,480 | B2* | 4/2014 | Flynt | H04M 1/72522 |
| | | | | 715/726 |
| 2002/0115476 | A1* | 8/2002 | Padawer | H04M 1/27455 |
| | | | | 455/564 |
| 2003/0135498 | A1* | 7/2003 | Bodin | G06F 3/0481 |
| 2004/0213409 | A1* | 10/2004 | Murto | H04L 29/06 |
| | | | | 380/258 |
| 2006/0026170 | A1* | 2/2006 | Kreitler | G06F 16/9537 |
| 2007/0150516 | A1* | 6/2007 | Morgan | G06F 16/258 |

(Continued)

FOREIGN PATENT DOCUMENTS

EP 2077436 7/2009

OTHER PUBLICATIONS

Sep. 19, 2012, Apple, "Location Awareness Programming Guide", Sep. 19, 2012, 71 pages.

(Continued)

*Primary Examiner* — Maryam M Ipakchi
(74) *Attorney, Agent, or Firm* — Alston & Bird LLP (57) ABSTRACT

An apparatus comprising:
at least one processor; and
at least one memory including computer program code,
the at least one memory and the computer program code configured to, with the at least one processor, cause the apparatus to perform at least the following:
provide for use of a location shortcut, at an operating system level for an electronic device, to enable entering a location into a plurality of applications configured to run on the operating system.

18 Claims, 7 Drawing Sheets

(56) References Cited

U.S. PATENT DOCUMENTS

| | | | | |
|---|---|---|---|---|
| 2007/0294294 | A1* | 12/2007 | Aarnio | G06F 16/58 |
| 2008/0134088 | A1* | 6/2008 | Tse | G06F 3/0481 |
| | | | | 715/810 |
| 2008/0168382 | A1 | 7/2008 | Louch et al. | |
| 2008/0172635 | A1* | 7/2008 | Ross | G06F 3/04815 |
| | | | | 715/826 |
| 2010/0080201 | A1* | 4/2010 | Rosenblatt | H04W 4/02 |
| | | | | 370/338 |
| 2010/0254608 | A1* | 10/2010 | Flesselles | G06F 40/174 |
| | | | | 382/182 |
| 2011/0083101 | A1* | 4/2011 | Sharon | H04W 4/21 |
| | | | | 715/800 |
| 2011/0145739 | A1 | 6/2011 | Berger et al. | |
| 2012/0192247 | A1* | 7/2012 | Oliver | G06F 21/6245 |
| | | | | 726/1 |
| 2012/0203663 | A1* | 8/2012 | Sinclair | G06F 21/30 |
| | | | | 705/26.41 |
| 2012/0254804 | A1* | 10/2012 | Sheha | G06F 3/0488 |
| | | | | 715/834 |
| 2015/0334077 | A1* | 11/2015 | Feldman | H04L 51/32 |
| | | | | 715/744 |

OTHER PUBLICATIONS

"[patch] Location Sharing in Messaging—PreCentral Forums" [online] [retrieved Mar. 4, 2021] Retrieved from the Internet: <https://web.archive.org/web/20110921122910/http://fomms.precentral.net/webos-patches/284823-patch-location-sharing-messaging.html>. (Sep. 21, 2011), 6 pages.

* cited by examiner

LOCATION TEXT

TECHNICAL FIELD

The present disclosure relates to the field of user interfaces, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs), mobile telephones, smartphones and other smart devices, and tablet PCs.

The portable electronic devices/apparatus according to one or more disclosed aspects/embodiments may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

It is common for electronic devices to provide a user interface (e.g. a graphical user interface). A user interface may enable a user to interact with an electronic device, for example, to open applications using application icons, enter commands, to select menu items from a menu, or to enter characters using a virtual keypad. To enter characters, the user may be provided with a physical or virtual keyboard.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect there is provided an apparatus comprising:
at least one processor; and
at least one memory including computer program code,
the at least one memory and the computer program code configured to, with the at least one processor, cause the apparatus to perform at least the following:
provide for use of a location shortcut, at an operating system level for an electronic device, to enable entering a location into a plurality of applications configured to run on the operating system.

The apparatus may be configured to enable entry of the current location into a user input field. A user input field may be configured to enable text to be entered (e.g. using the location shortcut and/or another text entry method, such as using a keyboard). A user input field may be configured to enable an image to be entered (e.g. instead of or in addition to text). A user input field may comprise, for example, an editable document, an online form field, a message entry field, or a search entry field (e.g. of a web-based search engine). A user input field may be a text field. A text field may be an online form field, a message entry field, or a search entry field. A user input field may be a editable document. For example, it will be appreciated that when a user opens, for example, a word document in a text editing application, the document is presented as an editable document user input field.

The location may be considered to be information which allows a place or geographical position to be identified. For example a location may comprise one or more of text; graphical content; an aerial photograph; a map image; a street view image; a grid reference; an address; a country; a state; a county; a time zone; a city; a block; a street; a house number; a zip code; or a postal code. The format of the location may be dependent on the particular user input field; or the particular user application. For example in one user input field an address location may be entered as "12 Sherwood Drive, Nottingham, UK", whereas in a second user input field, the address location corresponding to the same location may be entered as "UK, Nottingham, 12 Sherwood Drive".

Similarly, the accuracy of the location may be dependent on the particular user input field; or the particular user application. The accuracy of the location may relate to the area covered by the location (e.g. an entered location covering a small area may be more accurate than an entered location covering a large area). For example, in a first application the location corresponding to a current location may be entered as "2 Sherwood Drive, Nottingham, UK", whereas in a second application the location corresponding to the same current location may be entered as "Nottingham, UK" (i.e. without specifying the street or house number). It will be appreciated that as the entered location of the second application corresponds to a larger area than the entered location of the first application, the entered location of the second application may be considered to be less accurate than the entered location of the first application.

The location may be the current location of an electronic device.

The location shortcut may be configured to be used to enter a location into a particular application of the plurality of applications during running of the particular application. That is, the location shortcut may be configured to be used to enter a location into a particular one foreground running application of the plurality of applications available for use on an electronic device running the operating system.

The apparatus may be configured to determine the current location of the device/user/apparatus. The apparatus may be configured to determine a location for entry (e.g. based on where the device has been or in response to user interaction with a mapping application). The location determination may be carried out using a combination of one or more of: GPS; cell identification; and WiFi identifications to find the user's coordinates. The location determination may comprise matching determined coordinates with an address (e.g. a street) or business name (e.g. using a location database). It will be appreciated that, determining the location of the device/user/apparatus enables the user to use the shortcut to enter a current location without having knowledge of the current location or manually enter details of the current location.

The location shortcut may be a combination of one or more of a particular user interface element, a pop-up menu item (a pop-up menu may be a menu which is configured to appear on a graphical user interface), a menu item (a menu may be associated with an existing indication of an available menu), a virtual key, a physical key, a particular gesture input and an icon.

The apparatus is configured to calculate or determine the current location of the electronic device or apparatus (or user) based on information received from a remote source. A remote source may be, for example, another electronic device, a remote server, or a satellite. For example, an embodiment may be configured to calculate the current location based on time signals received from one or more satellites. Another embodiment may be configured to determine the current location for entry by matching an address to a grid reference set of coordinates using a database received from a remote server via the internet.

The apparatus may be configured to calculate or determine the current location for the electronic device or apparatus using one or more of: a satellite navigation system, a Global Positioning System, assisted GPS, cellular system, a network, and the internet.

The entered location may comprise one or more of: text; graphical content (e.g. an image, a map, an aerial photograph); and a link (e.g. a hyperlink to a webpage of a map of the location). The entered location may comprise a relative location (e.g. measured relative to another position, such as, relative to the device's current location), or an absolute location (e.g. a grid reference, address).

The location shortcut may be a particular user interface element (e.g. an icon, a menu item, a virtual keyboard key, a physical keyboard key).

The format and/or context of the entered location may be dependent on the particular user input field; or the particular user application. For example, some fields (e.g. user input fields) may require that an address location is entered as a single line where the elements of the address are separated by commas. Other fields may require that the address is entered as a multiple line, where the elements of the address are displayed on a new line. Other fields may require that a particular part of the address is entered (e.g. a first field may require the street name only, whereas a second field may require a street name and the city or town name). Thus, the apparatus may consider the format and/or content required by the text field and enable the location shortcut to provide the appropriate content/format for the particular text field in question.

The entered location may comprise rich text, for example including a hyperlink (e.g. to a map or mapping website).

The apparatus may be configured to enter a pre-determined or pre-defined location (e.g. the current location of the device/apparatus) in response to the location shortcut being selected.

The apparatus may be configured to allow a location to be selected by the user (e.g. from a map) in response to the location shortcut being selected, the selected location being entered into the application.

The user input field enables content to be entered for transmission from an electronic device (e.g. the user input field enables a text message to be composed for transmission to another electronic device).

The apparatus may be configured to provide a temporary visual confirmation that the location shortcut has been selected. The temporary visual confirmation may comprise text or an icon placed in the position where the location is to be entered. For example, after the shortcut has been selected, but before the location for entry has been determined, the apparatus may be configured to provide a temporary visual confirmation (e.g. text saying 'acquiring location) in the user entry field. When the location is determined, this temporary visual confirmation may be replaced by the entered location.

The apparatus may be configured to enable the location to be entered in a position corresponding to a content-entry cursor (e.g. a text-entry cursor).

The apparatus may be a portable electronic device, a laptop computer, a mobile phone, a Smartphone, a tablet computer, a personal digital assistant, a digital camera, a watch, a server, or a module/circuitry for one or more of the same a non-portable electronic device, a desktop computer, a monitor, a server, or a module/circuitry for one or more of the same.

The plurality of applications configured to run on the operating system may comprise a combination of two or more web browser applications, messaging applications (e.g. for SMS, MMS, messaging), email applications, videoconferencing applications, word processing applications, spreadsheet applications, calendar applications, and file storage applications. For example, the plurality of applications may comprise two web-browser applications, or an email application and a calendar application.

The operating system may be considered to be one or more computer programs that manage computer hardware resources and/or provide common services for application software. Each of the plurality of applications may be configured to run on the operating system. Examples of operating systems may include, for example, Microsoft Windows (for desktops/mobile phones), Apple OS (e.g. Mac OS X), Android, and Symbian.

In a second aspect there is provided a method, the method comprising:
providing for use of a location shortcut, at an operating system level for an electronic device, to enable entering a location into a plurality of applications configured to run on the operating system.

In a third aspect there is provided a computer program comprising computer program code, the computer program code being configured to perform at least the following:
provide for use of a location shortcut, at an operating system level for an electronic device, to enable entering a location into a plurality of applications configured to run on the operating system.

The computer program may be stored on a storage media (e.g. on a CD, a DVD, a memory stick or other non-transitory medium). The computer program may be configured to run on a device or apparatus as an application. An application may be run by a device or apparatus via an operating system. The computer program may form part of a computer program product.

In a further aspect there is provided an apparatus, the apparatus comprising:
means for providing configured to provide for use of a location shortcut, at an operating system level for an electronic device, to enable entering a location into a plurality of applications configured to run on the operating system.

The present disclosure includes one or more corresponding aspects, embodiments or features in isolation or in various combinations whether or not specifically stated (including claimed) in that combination or in isolation. Corresponding means and corresponding function units (e.g. shortcut provider, location enterer) for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE
ASPECTS/EMBODIMENTS

It is common for an electronic device to have a user interface (which may or may not be graphically based) to allow a user to interact with the device to enter information. For example, the user may use a keyboard user interface to enter text to provide, for example, location information. Particularly if the user interface is restricted (e.g. limited in terms of user interface elements such as keys, or in terms of area), the user may have to spend a considerable time and effort in performing the same task (e.g. entering a location) repeatedly. For example, a user may have to manually enter text corresponding to a location in order to send an email (giving an address) and enter the same location text again to update a social networking site.

It may therefore be beneficial to provide a shortcut to allow the user to enter a location. This may allow the location to be entered using fewer keystrokes, gestures, and/or commands. Example embodiments contained herein may be considered to provide for use of a location shortcut, at an operating system level for an electronic device, to enable entering a location into a plurality of applications configured to run on the operating system.

By providing a shortcut at an operating system level, it will be appreciated that the shortcut may be accessible to the user from a plurality of user applications. This may allow the user interface to be more intuitive to the user.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

Figures 1, 3:
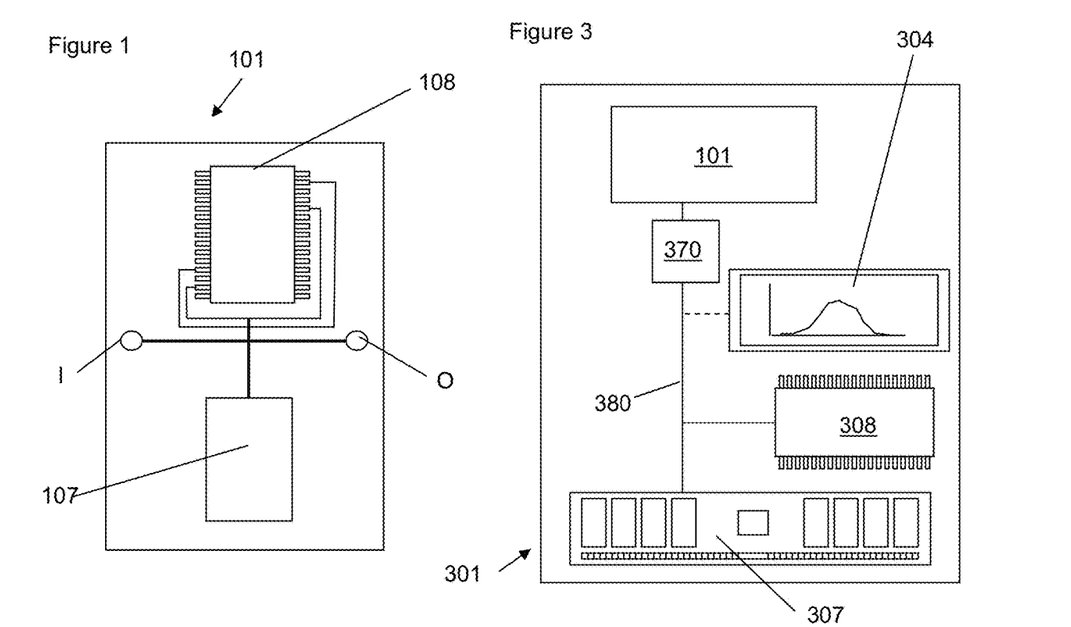
FIG. 1 depicts an example embodiment comprising a number of electronic components, including memory and a processor.
FIG. 3 depicts an example embodiment comprising a number of electronic components, including memory, a processor and a communication unit.

FIG. 1 shows an apparatus (101) comprising memory (107), a processor (108), input I and output O. In this embodiment only one processor and one memory are shown but it will be appreciated that other embodiments may utilise more than one processor and/or more than one memory (e.g. same or different processor/memory types).

In this embodiment the apparatus (101) is an Application Specific Integrated Circuit (ASIC) for a portable electronic device with a touch sensitive display. In other embodiments the apparatus (101) can be a module for such a device, or may be the device itself, wherein the processor (108) is a general purpose CPU of the device and the memory (107) is general purpose memory comprised by the device.

The input I allows for receipt of signalling to the apparatus 101 from further components, such as components of a portable electronic device (like the touch-sensitive display 240) or the like. The output O allows for onward provision of signalling from within the apparatus 101 to further components. In this embodiment the input I and output O are part of a connection bus that allows for connection of the apparatus 101 to further components.

The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more example embodiments, provide an active coupling between the processor 108 and the memory 107 to allow the processor 108 to access the computer program code stored on the memory 107.

In this example the input I, output O, processor 108 and memory 107 are all electrically connected to one another internally to allow for electrical communication between the respective components I, O, 108, 107. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
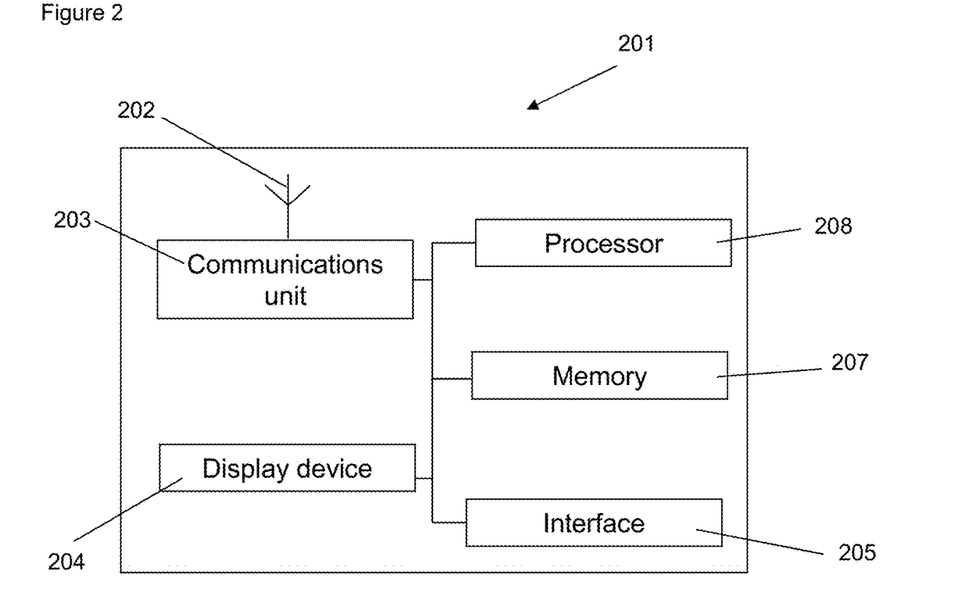
FIG. 2 depicts an example embodiment comprising a number of electronic components, including memory, a processor and a communication unit.

FIG. 2 depicts an apparatus (201) of a further example embodiment, such as a mobile phone. In other example embodiments, the apparatus (201) may comprise a module for a mobile phone (or PDA or audio/video player), and may just comprise a suitably configured memory (207) and processor (208).

The example embodiment of FIG. 2, in this case, comprises a display device (204) such as, for example, a Liquid Crystal Display (LCD) or touch-screen user interface. The apparatus (201) of FIG. 2 is configured such that it may receive, include, and/or otherwise access data. For example, this example embodiment (201) comprises a communications unit (203), such as a receiver, transmitter, and/or transceiver, in communication with an antenna (202) for connecting to a wireless network and/or a port (not shown) for accepting a physical connection to a network, such that data may be received via one or more types of networks. This example embodiment comprises a memory (207) that stores data, possibly after being received via antenna (202) or port or after being generated at the user interface (205). The processor (208) may receive data from the user interface (205), from the memory (207), or from the communication unit (203). It will be appreciated that, in certain example embodiments, the display device (204) may incorporate the user interface (205). Regardless of the origin of the data, these data may be outputted to a user of apparatus (201) via the display device (204), and/or any other output devices provided with apparatus. The processor (208) may also store the data for later use in the memory (207). The memory (207) may store computer program code and/or applications which may be used to instruct/enable the processor (208) to perform functions (e.g. read, write, delete, edit or process data).

FIG. 3 depicts a further example embodiment of an electronic device (301), such as a tablet personal computer, a portable electronic device, a portable telecommunications device, a server or a module for such a device, the device comprising the apparatus (101) of FIG. 1. The apparatus (101) can be provided as a module for device (301), or even as a processor/memory for the device (301) or a processor/memory for a module for such a device (301). The device (301) comprises a processor (308) and a storage medium (307), which are connected (e.g. electrically and/or wirelessly) by a data bus (380). This data bus (380) can provide an active coupling between the processor (308) and the storage medium (307) to allow the processor (308) to access the computer program code. It will be appreciated that the components (e.g. memory, processor) of the device/apparatus may be linked via cloud computing architecture. For example, the storage device may be a remote server accessed via the internet by the processor.

The apparatus (101) in FIG. 3 is connected (e.g. electrically and/or wirelessly) to an input/output interface (370) that receives the output from the apparatus (101) and transmits this to the device (301) via data bus (380). Interface (370) can be connected via the data bus (380) to a display (304) (touch-sensitive or otherwise) that provides information from the apparatus (101) to a user. Display (304) can be part of the device (301) or can be separate. The device (301) also comprises a processor (308) configured for general control of the apparatus (101) as well as the device (301) by providing signalling to, and receiving signalling from, other device components to manage their operation.

The storage medium (307) is configured to store computer code configured to perform, control or enable the operation of the apparatus (101). The storage medium (307) may be configured to store settings for the other device components. The processor (308) may access the storage medium (307) to retrieve the component settings in order to manage the operation of the other device components. The storage medium (307) may be a temporary storage medium such as a volatile random access memory. The storage medium (307) may also be a permanent storage medium such as a hard disk drive, a flash memory, a remote server (such as cloud storage) or a non-volatile random access memory. The storage medium (307) could be composed of different combinations of the same or different memory types.

FIGS. 4a-4d depicts an example embodiment of the apparatus depicted in FIG. 2 comprising a portable electronic communications device (401), e.g. such as a mobile phone, with a user interface comprising a touch-screen user interface (405, 404), a memory (not shown), a processor (not shown) and an antenna (not shown) for transmitting and/or receiving data (e.g. emails, textual messages, phone calls, information corresponding to web pages).

Figure 4A:
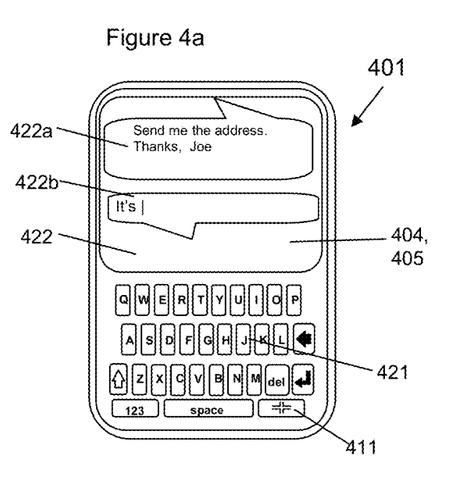
FIG. 4*a*-4*d* depicts an example embodiment wherein the location shortcut is provided by a virtual key.

In the situation depicted in FIG. 4a, the device is displaying a messaging application screen corresponding to a running messaging application. The messaging application screen comprises a virtual keyboard (421), the virtual keyboard comprising letter keys arranged according to a QWERTY layout, and a location shortcut key (411). It will be appreciated that, as the location shortcut key (411) forms part of the virtual keyboard (421), the location shortcut key (411) may be available in multiple applications (e.g. an email application and/or text processing application as well as the messaging application), and that it is provided at an operating system level (rather than being an application specific location shortcut).

It will be appreciated that other example embodiments may be configured to provide other keyboard layouts. For example a keyboard or keypad may comprise an alphanumeric key input area, a numeric key input area, an AZERTY key input area, a QWERTY key input area or an ITU-T E.161 key input area.

The messaging application screen also comprises a message region (422) configured to display: previously sent messages (none shown in the situation depicted in FIG. 4a), previously received messages (422a); and editable messages (422b) which are being prepared for sending. In this example, the user wishes to enter a location into the editable message (422b), for example, to inform his friend where a particular store is.

Figure 4B:
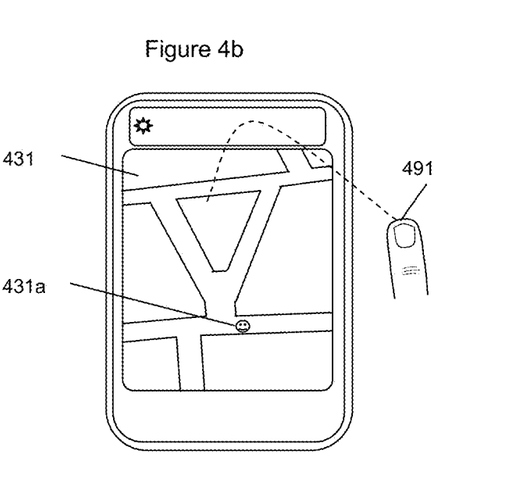
Figure 4C:
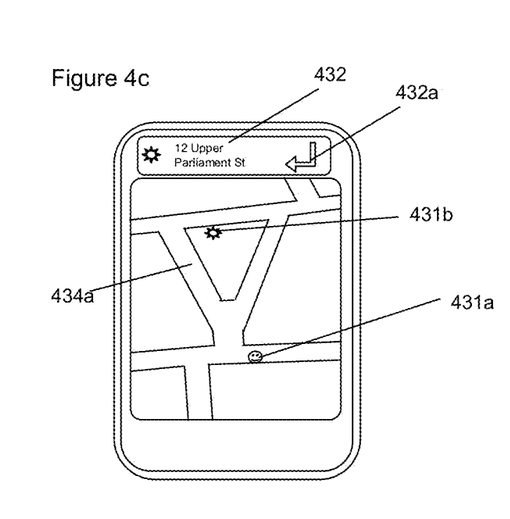

In this case, in order to enable entering a location into the editable message at the position of the content-entry cursor (e.g. a text-entry cursor), the user selects the location shortcut key (411) (e.g. by pressing or hovering over the location shortcut key with a stylus, which may be a finger) which opens a map screen. That is, the apparatus is configured allow a location to be selected by providing a map wherein one or more locations of the map are user-selectable. In this example, the map (431) displayed in the map screen corresponds to the region around the user's current location (although it could be remote to the user's current location). The user's current location is indicated by a current location indicator (431a). This example embodiment is configured such that the user can select a location on the displayed map (431) by selecting a particular point on the map corresponding to that location using a stylus (e.g. the user's finger (491)). This is shown in FIG. 4b. As depicted in FIG. 4c, the apparatus/device is configured to indicate the position of the selected point on the screen using a selected point indicator (431b) and determine an address location corresponding to the selected point (e.g. the determination comprising finding the address corresponding to the selected point coordinates on a database which may be stored on a remote server), the determined address being displayed in a selected location field (432).

Figure 4D:
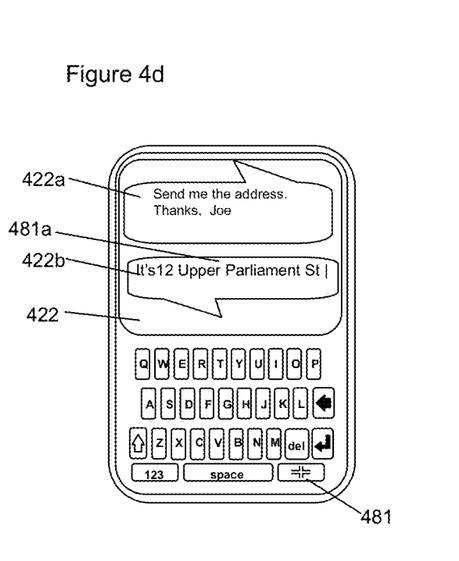

For this embodiment, the apparatus/device is configured to enter the selected location into the user input field in response to the user selecting a selected location confirmation icon (432a) (as shown in FIG. 4d). It will be appreciated that other example embodiments may be configured to automatically enter the selected location directly in response to the user selecting the desired location. In this way, the apparatus/device is configured to allow a location to be selected by the user (e.g. from a map) in response to the location shortcut being selected, the selected location being entered into the running application.

It will be appreciated that, the same location shortcut key (411) can be used in other applications to allow the user to select a location from a map which is then can be entered into the other applications. For example, this embodiment may comprise a text editing application which allows the user to enter text corresponding to a location into a text editing field. Another example embodiment may comprise an image editor, configured to enable an image corresponding to the location (e.g. a map image or a street view image, a satellite image, an aerial photograph) to be entered. It will also be appreciated that an image corresponding to the location can be inserted adjacent to text without the use of an image editor application e.g. insertion of a map into an MMS adjacent to a text.

It will be appreciated that the shortcut may be provided in other ways. For example, the shortcut may be provided as: a button on a virtual (or soft) keyboard; a pop-up menu on user input field; a pop-up menu on soft keyboard (FIG. 4a); or a key on an alternative virtual (or soft) keyboard (e.g. the alternative virtual keyboard comprising keys to enter other generated text); or an icon (e.g. configured to be positioned within the user entry field).

In this example, the map was displayed on a dedicated screen. It will be appreciated that for other example embodiments, the map configured to allow the user to select the location for entry may be provided on a pop-up window.

FIGS. 5a-5f depict a further example embodiment comprising a portable electronic device (501), e.g. such as a mobile phone, with a user interface comprising a touchscreen user interface (505, 504), a memory (not shown), a processor (not shown) and an antenna (not shown) for transmitting and/or receiving data (e.g. emails, textual messages, phone calls, information corresponding to web pages). Unlike the previous embodiment wherein a keyboard was provided by a virtual keyboard, the keyboard of this embodiment is a physical keyboard (521). In this example, the location shortcut (581) is provided by a physical key of the physical keyboard.

Figure 5A:
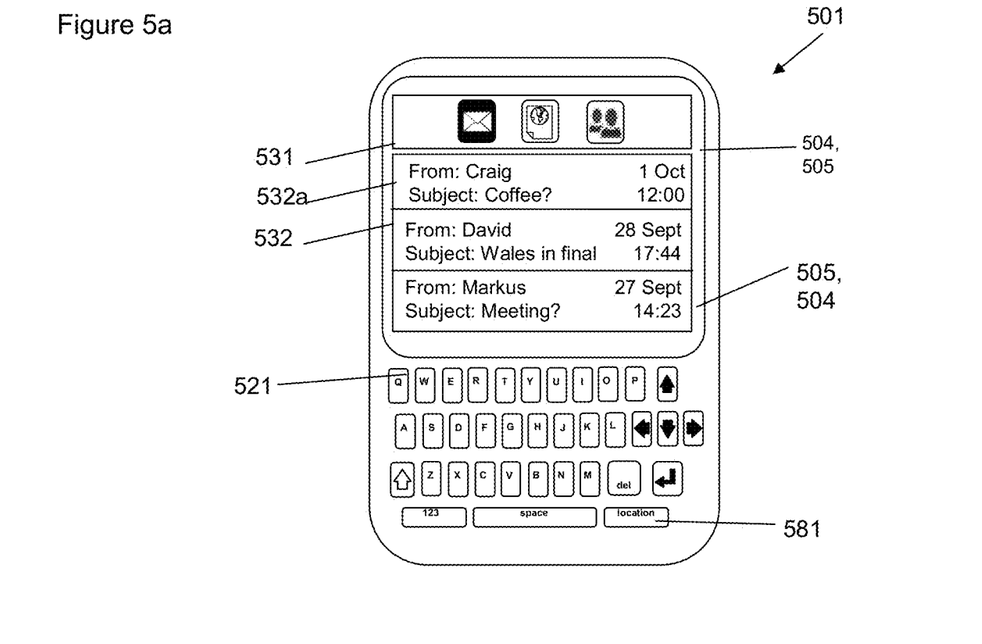
FIG. 5*a*-5*f* depicts a further example embodiment wherein the location shortcut is provided by a physical key.

In this case, the device/apparatus is configured to provide, via an operating system, an email application, a web browser application and a messaging application. FIG. 5a depicts the electronic device when the email application is running. When an application is running the display is configured to show a running application region (532) corresponding to the running application (which is the email application in this case), and an application icon region (531) having an icon corresponding to each of the available applications. In the situation depicted in FIG. 5a, the running application region (532) comprises a list of messaging conversations. The user wishes to continue his messaging conversation with the remote contact 'Craig' and so selects the corresponding messaging conversation (532a) by pressing or hovering over the touch screen user interface.

Figure 5B:
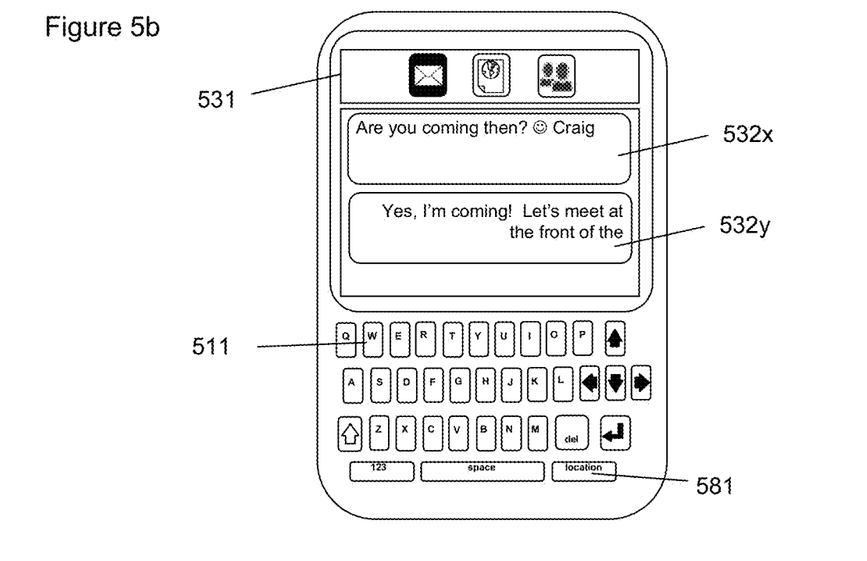

FIG. 5b shows the device when the Craig messaging conversation is open. In this situation, the running messaging application comprises the last received message (532x) and an editable message (531y) which the user is preparing to reply to the last received message. In this case, the user wants to enter his current location in order to let his friend Craig know where he is. In this case the device/apparatus is configured to enter the user's current location in response to the user selecting the physical key location shortcut (581). Therefore, pressing the physical key location shortcut (581) allows the user to automatically enter the current location into the user input field of the running messaging application. Unlike the previous example embodiment which allowed the user to select a location for entry from a map, the location for entry is predetermined to be the current location of the device/apparatus (e.g. at the time the location shortcut is selected). This example embodiment is configured to determine or calculate the current location using GPS. That is, the apparatus is configured to calculate the current location as a grid reference based on time signals received from satellites (which may be considered to be a remote source). Based on this grid reference location, the apparatus is configured to determine an address location corresponding to the grid reference location using a database (e.g. stored on the electronic device or on a remote server).

It will be appreciated that other example embodiments may be configured to determine the location in other ways, for example, by using radio signal transmitters, or assisted GPS. A remote server source may be used to provide the current location (e.g. via the internet), or a particular location which is not the current location.

Figure 5C:
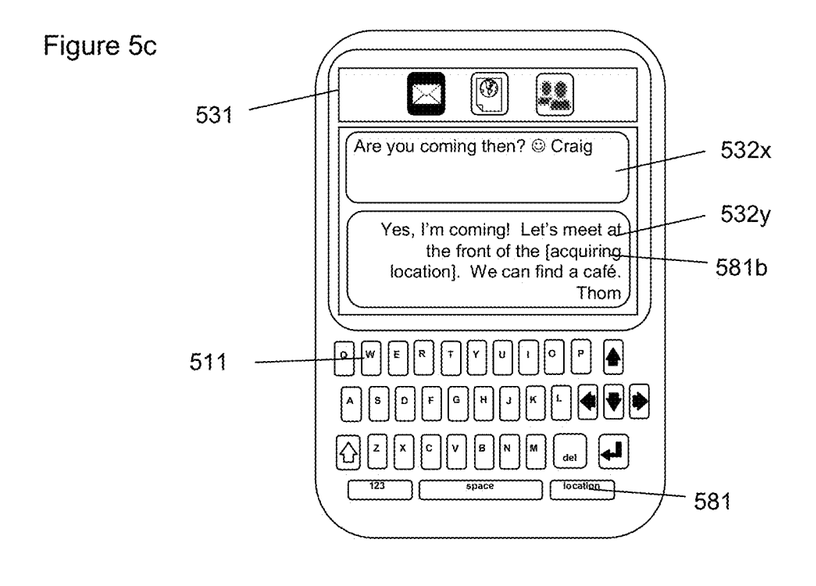

In the situation depicted in FIG. 5c, the user has selected the physical key location shortcut (581) and has continued entering text into the editable message (532y). In this case, the apparatus/device is configured to enable the user to interact with the device as the device is determining the current location. The user is provided with visual confirmation that the location shortcut has been selected in the form of temporary text (581b) (which may be considered to be a temporary visual confirmation), in this case, saying 'acquiring location'. In this example embodiment the temporary text (581b) is positioned where the location information will be inserted.

Figure 5D:
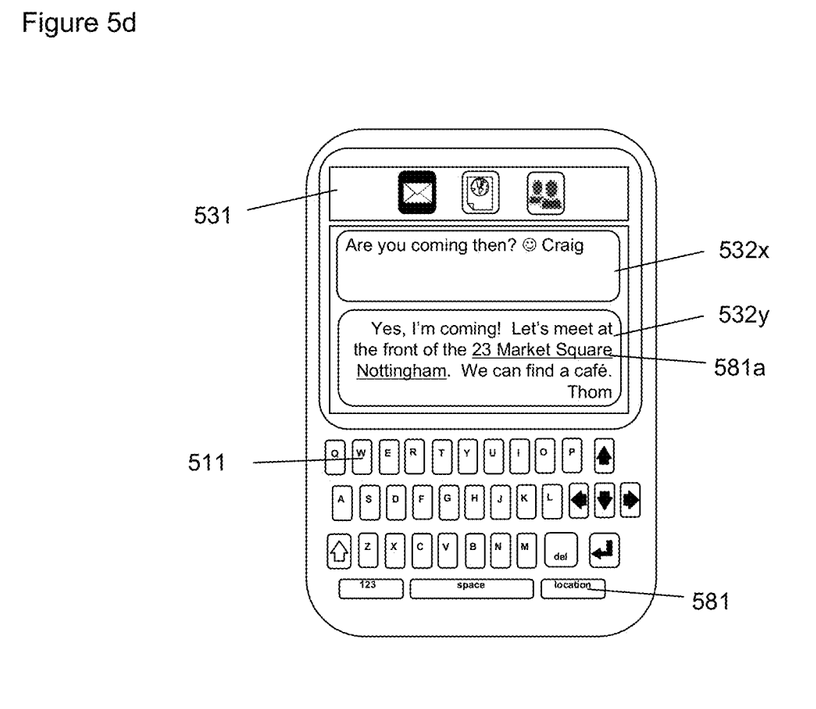

After the device has determined the current location, or received information relating to the current location, this embodiment is configured to replace the temporary visual confirmation text (581b) with the location (581a) of the device/user (as shown in FIG. 5d). In this case the location (581a) is entered as an address. In this example, embodiment, the text making up the address is a hyperlink (in this case indicated by the text being underlined) which is associated with a map webpage of giving a map of the entered address location. This allows the recipient to quickly and easily determine the corresponding location even if they are unfamiliar with the address. It will be appreciated that other example embodiments may be configured to send a hyperlink without text (e.g. a generic location icon). After the location has been determined, the user then sends this message to his friend. It will be appreciated that pressing the location shortcut may be less burdensome on the user than entering the address using the keyboard (e.g. as fewer keystrokes may be required).

It will be appreciated that other example embodiments may be configured to enter the location as a grid reference (coordinates), or as an image. It will be appreciated that different embodiments may be configured to enter a location with a particular level of accuracy (e.g. the accuracy or format of the location may be pre-determined, user-defined, depend on the application and/or on the particular entry field). For example, the location may indicate one or more of: the country, state, county, time zone, city, block, street, house number, zip code and postal code. It will be appreciated that the device may be configured such that if the location is not determined (e.g. resolved) when the user provides a command to 'send' the message (or otherwise navigate away from the editing screen), the message may be is stored in an outbox until the location is resolved. Other example embodiments may be configured to provide a warning if the location is not determined when a further function is requested/selected.

It will be appreciated that whilst the temporary text is being displayed, if the user deletes the temporary text, the device may be configured not to enter a location. It will be appreciated that other example embodiments may be configured to cancel location determination in response to the temporary text being deleted.

Figure 5E:
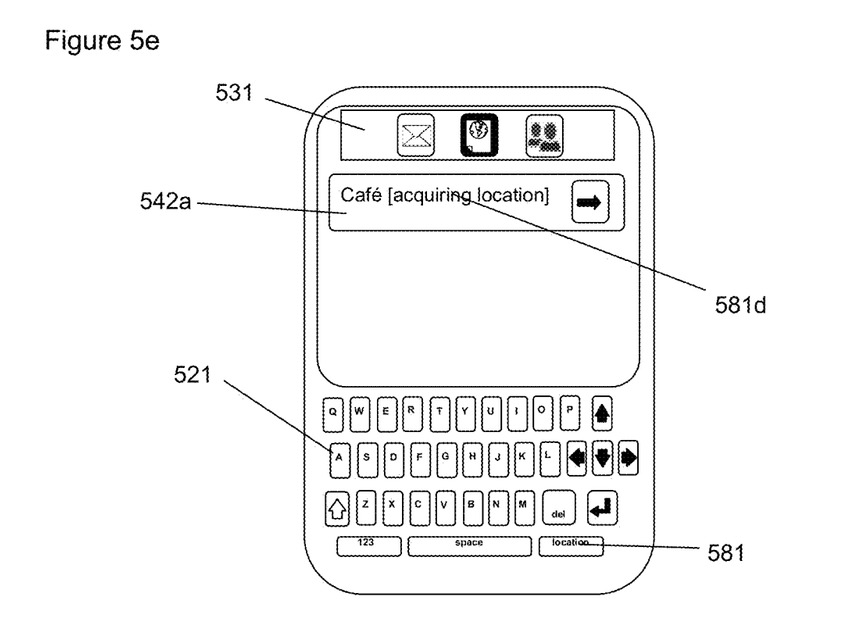

In this example, the user then wishes to find a café nearby by searching on the internet. The user opens the web browsing application by selecting the corresponding web browsing application icon from the available application icon region (531). This opens a search engine web page as a default page. In this case, the search engine web page comprises a user input field (542a), which is a search field configured to allow the user to enter textual search terms. In this case the user enters the search term 'Café' and then presses the physical key location shortcut (581) (as shown in FIG. 5e). As with the previous application, the apparatus/device is configured to enter temporary (placeholder) visual confirmation text (581d), at the position of the content-entry cursor, indicating that the location shortcut has been selected and that the device is determining the current location.

After the location has been determined, this embodiment is configured to replace the temporary text with the location. In this way, the location is entered into the user entry field. It will be appreciated that other embodiments may provide other indicators (e.g. other than the temporary text indicator) to indicate that the location shortcut has been selected and/or that the device is determining the current location. The user then can search for the completed search string using the search engine. Thus, it will be appreciated that some embodiments may be configured to allow the user to request a function (e.g. in this case requesting a search, or sending a message) before the location is determined, such that when the location is determined the function is performed (automatically or following user confirmation). Other embodiments may require that the location is determined before further functions are available.

Figure 5F:
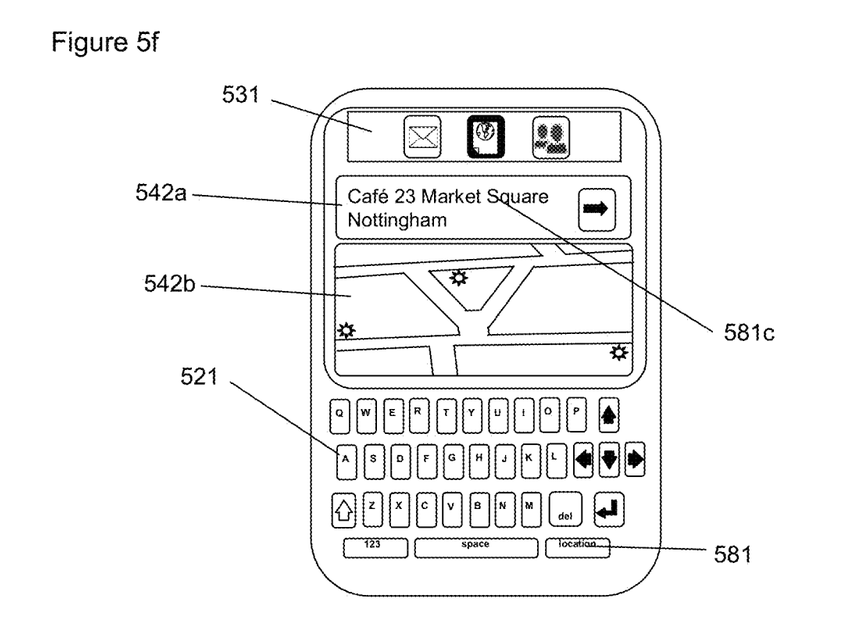

When the user has searched for this search string comprising the term 'Café' and the current location (581c) (in this case, entered as an address location) the closest cafés are displayed as search results (indicated by stars) on a map (542b), as shown in FIG. 5f. It will be appreciated that other example embodiments may provide a shortcut which enables a user to select a particular search result (e.g. a corresponding to café the user is walking towards and will be at in the near future) as a location to be entered into a message for transmission (e.g. to a friend).

It will be appreciated that the location shortcut may also be available in the messaging application. By making the location shortcut available to multiple applications, the burden on the user in entering location information is reduced. In this example embodiment, wherein the location corresponds to the current location of the device and is determined by the apparatus/device, the user may not need to know the location of the device to make use of the location shortcut.

FIGS. 6a-6f depict a further example embodiment comprising a portable electronic device/apparatus (601), e.g. such as a personal digital assistant, with a user interface comprising a touch-screen user interface (605, 604), a memory (not shown), a processor (not shown) and an antenna (not shown) for transmitting and/or receiving data (e.g. emails, textual messages, phone calls, information corresponding to web pages).

Figure 6A:
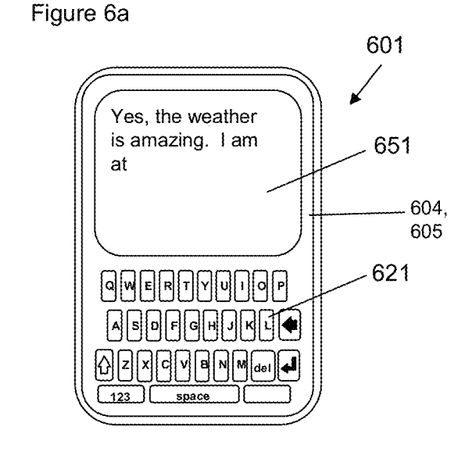
FIGS. 6*a*-6*f* depicts an example embodiment wherein the location shortcut is provided by a menu item in a pop-up menu.

In this situation depicted in FIG. 6a, the user is entering text into an email to send to a friend using an email application (which is a running foreground application in FIG. 6a), the email application being supported by an operating system. When the email application is the active foreground application, the user is provided with a virtual keyboard (611). In the situation depicted in FIG. 6a, the user has already entered some text into a user input field (651) of the email application using the virtual keyboard (611). The user wishes to let his friend know where he is by entering his current location into the email message. In this case, the device is configured to provide a location shortcut (681) as a menu item of a pop-up menu (682), the pop-up menu (682) being displayed in response to a particular user gesture. In this case the pop-up menu particular user gesture is a multi-touch gesture (e.g. pressing the screen with a thumb and forefinger). It will be appreciated that other example embodiments may be configured to display the shortcut in response to detecting other user inputs (e.g. right clicking a mouse or double tap).

Figure 6B:
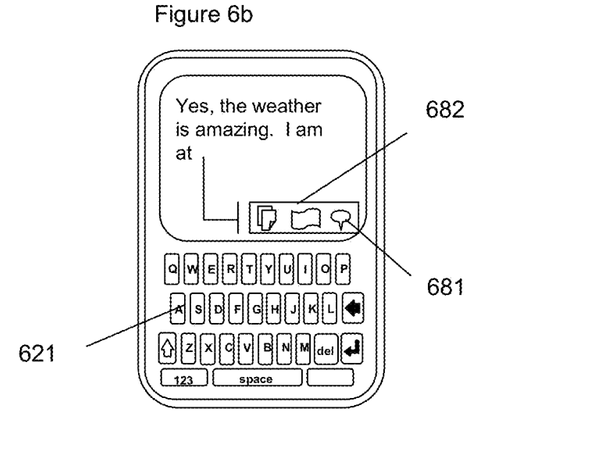

In the situation depicted in FIG. 6b, the user has provided a multi-touch gesture and the pop-up menu is displayed on the screen. The pop-up menu comprises a number of icons: a copy icon, allowing the user to copy, for example a portion of text to a clipboard; a paste icon, allowing the user to insert an item from the clipboard; and a current location shortcut icon (681), allowing a user to enter a current location. That is, in this case, the apparatus is configured to enter the current location (which may be considered to be a pre-determined or pre-defined location) in response to the location shortcut being selected.

Figure 6C:
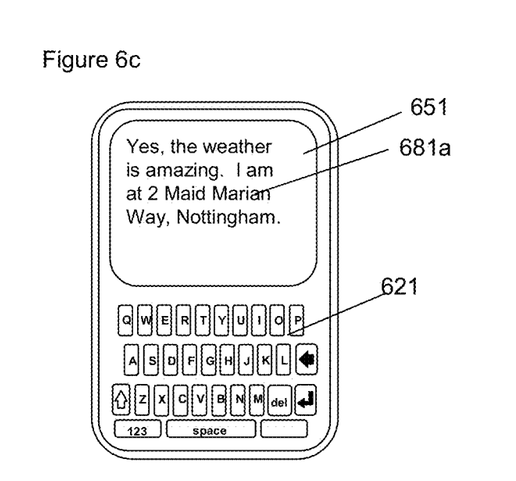

In this embodiment, the location accuracy/format is dependent on the application. For example, when the user selects the location shortcut to enter a location into the email application, the device is configured to enter a location (681a) in the form of an address comprising the city, the street and house number. This is depicted in FIG. 6c.

After the user has sent the email, he wishes to see what the weather will be for the next few days. He navigates to a weather application, supported by the operating system, which comprises a weather application location text entry field (652). The weather application is shown as the running foreground application in FIG. 6d. For this application, the current location shortcut is configured to enter the location in the form of an address comprising the city only. That is, for this example embodiment, the entered location is entered in a different format depending on the application.

Figure 6D:
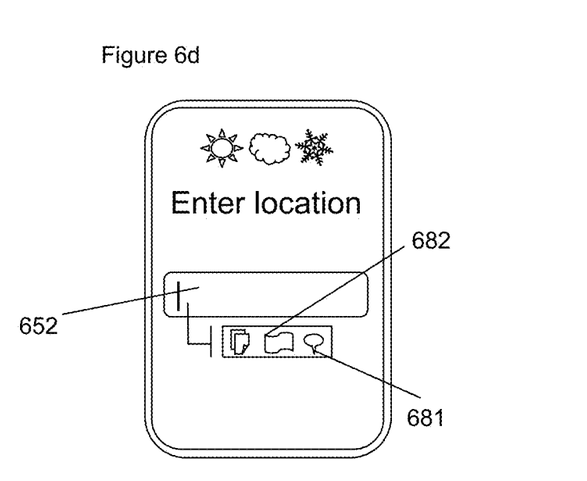
Figure 6E:
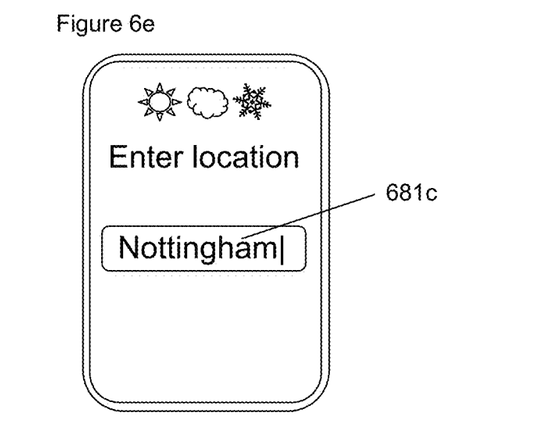
Figure 6F:
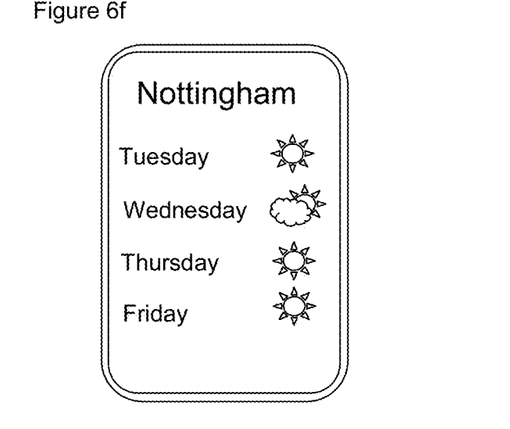

In the same way as for the email application, when in the weather application the location shortcut (681) is displayed in a pop-up menu (682) in response to a multi-touch gesture with the touch screen user interface. This is depicted in FIG. 6d. As described above, selecting the location shortcut enters the city name into the corresponding user input field of the weather application (as shown in FIG. 6e). When the location has been entered and searched, the weather application is configured to display a summary of the weather forecast for the next few days corresponding to the searched location. This is shown in FIG. 6f.

In each of the above embodiments, the location (whether pre-determined or user selected) is entered as text. It will be appreciated that other example embodiments may be configured to enter graphical information as the location. For example, the location may comprise an aerial photograph or an image of a map (e.g. received from a remote server via a network such as the internet). For example, it will be appreciated that an embodiment may be configured to calculate the location (e.g. as a grid reference) and request a corresponding map image for that grid reference from a remote server (e.g. via the internet). In this example the location for entry is received from a remote source (or derived from information received from a remote source). It will be appreciated that other example embodiments may be configured to generate the location for entry, for example, using location content stored on the device.

In the above described embodiment, the location shortcut is configured to be visible to and selectable by the user (e.g. as a virtual or physical key or menu item). It will be appreciated that the shortcut may comprise a particular user gesture. For example, an apparatus may be configured enable entering a location into a plurality of applications configured to run on the operating system, in response to a particular user gesture (e.g. a particular combination of tap and dragging gestures on a touch screen).

In this way, the apparatus provides for the use of a location shortcut, at an operating system level for an electronic device, which enables a user to enter a location into a plurality of applications configured to run on the operating system. By providing a shortcut, the user can easily enter information relating to the same location in different applications without having to manually enter the information in each application.

Figure 7:
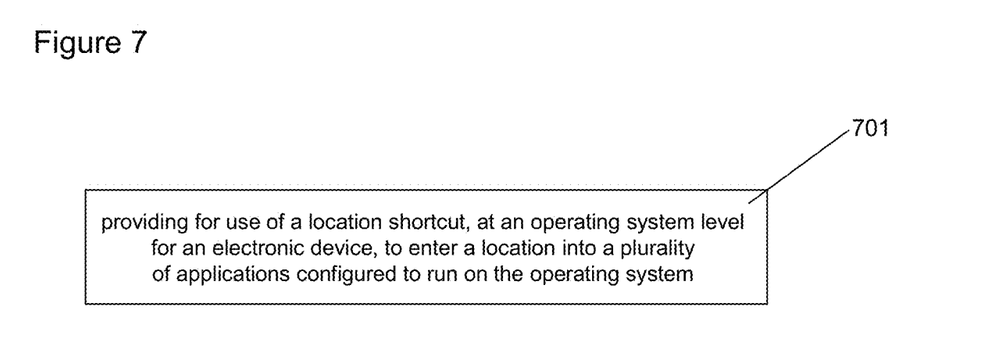
FIG. 7 illustrates a flowchart according to an example method of the present disclosure.

FIG. 7 illustrates the process flow according to an example embodiment of the present disclosure. The process comprises providing (701) for use of a location shortcut (e.g. virtual key, a physical key, a particular gesture input and an icon), at an operating system level for an electronic device, to enter a location into a plurality of applications (e.g. comprising a messaging application, a search application, an email application) configured to run on the operating system.

Figure 8:
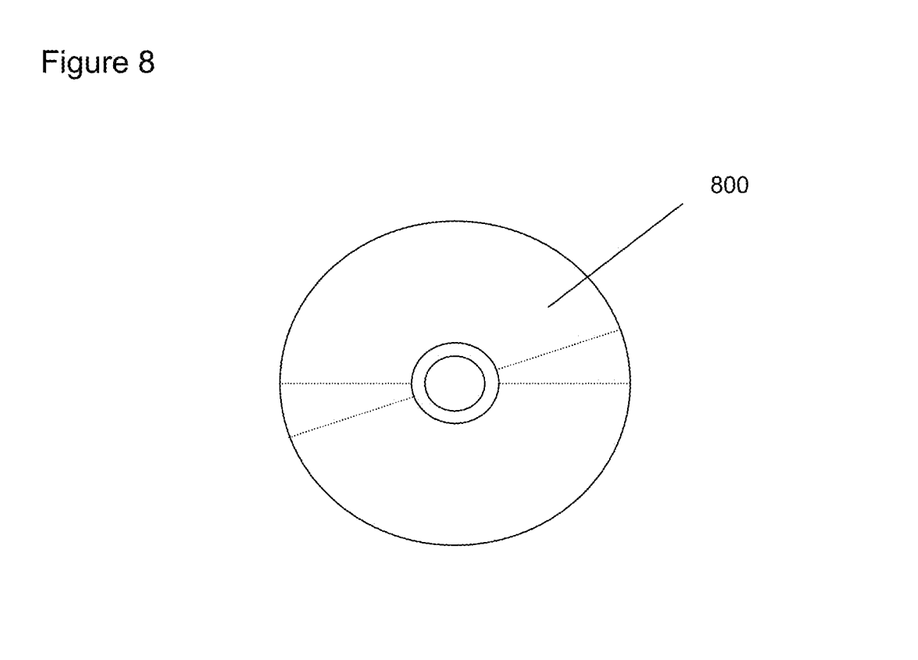
FIG. 8 illustrates schematically a computer readable medium providing a program.

FIG. 8 illustrates schematically a computer/processor readable medium (800) providing a program according to an embodiment. In this example, the computer/processor readable medium is a disc such as a Digital Versatile Disc (DVD) or a compact disc (CD). In other embodiments, the computer readable medium may be any medium that has been programmed in such a way as to carry out the functionality herein described. The computer program code may be distributed between the multiple memories of the same type, or multiple memories of a different type, such as ROM, RAM, flash, hard disk, solid state, etc.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the disclosure as applied to examples thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:
1. An apparatus comprising:
at least one processor; and
at least one memory including computer program code,
the at least one memory and the computer program code configured to, with the at least one processor, cause the apparatus to perform at least the following:

provide for use of a location shortcut, at an operating system level for an electronic device, and upon selection of the location shortcut, enable entering a location into a plurality of applications in a plurality of different formats depending on a respective application of the plurality of applications configured to run on the operating system including entering the location in a position corresponding to a content-entry cursor in a foreground running application, wherein the location is entered in a location-specific format that identifies a desired geographic area for the particular application and the format is dependent on the particular application in which the location is entered;

provide a temporary visual confirmation in the position corresponding to the content-entry cursor that the desired geographic area for the particular application and the format is being identified;

cause the formatted location to be transmitted to the particular application for processing according to the desired geographic area; and replace the temporary visual confirmation in the position corresponding to the content-entry cursor with the formatted location.

2. The apparatus of claim 1, wherein the location shortcut is configured to be used to enter a location into a particular one foreground running application of the plurality of applications available for use on an electronic device running the operating system.

3. The apparatus of claim 1, wherein the apparatus is configured to enable entry of the current location into a user input field of a particular one of the plurality of running applications using the location shortcut, during running of the particular one of the plurality of applications.

4. The apparatus of claim 3, wherein the user input field enables content to be entered for transmission from an electronic device.

5. The apparatus of claim 3, wherein the user input field comprises at least one of an editable document, a text field, an online form field, a message entry field, or a search entry field.

6. The apparatus of claim 1, wherein the location is the current location of the apparatus or the electronic device running the operating system.

7. The apparatus of claim 6, wherein the apparatus is configured to calculate or determine the current location of the electronic device or apparatus based on information received from a remote source.

8. The apparatus of claim 6, wherein the apparatus is configured to calculate or determine the current location for the electronic device or apparatus using one or more of: a satellite navigation system, a Global Positioning System, assisted GPS, cellular system, a network, and the internet.

9. The apparatus of claim 1, wherein the entered location comprises one or more of text; graphical content; an aerial photograph; a map image; a street view image; a grid reference; an address; a country; a state; a county; a time zone; a city; a block; a street; a house number; a zip code; a postal code and a link.

10. The apparatus of claim 1, wherein the location shortcut is a combination of one or more of a particular user interface element, a pop-up menu item, a menu item, a virtual key, a physical key, a particular gesture input and an icon.

11. The apparatus of claim 3, wherein the accuracy of the entered location is dependent on the particular user input field.

12. The apparatus of claim 1, wherein the apparatus is configured to provide for entry of a pre-determined or pre-defined location in response to the location shortcut being selected.

13. The apparatus of claim 1, wherein the apparatus is configured to allow a location to be selected by the user in response to the location shortcut being selected, the selected location being entered into a particular running foreground application.

14. The apparatus of claim 13 wherein the apparatus is configured allow a location to be selected by providing a map wherein one or more locations of the map are user-selectable.

15. The apparatus of claim 1, wherein the apparatus is configured to provide the temporary visual confirmation that the location shortcut has been selected.

16. The apparatus of claim 1, wherein the apparatus is a portable electronic device, a laptop computer, a mobile phone, a Smartphone, a tablet computer, a personal digital assistant, a digital camera, a watch, a server, or a module/circuitry for one or more of the same a non-portable electronic device, a desktop computer, a monitor, a server, or a module/circuitry for one or more of the same.

17. A method, comprising:

providing for use of a location shortcut, at an operating system level for an electronic device, and upon selection of the location shortcut, enable entering a location into a plurality of applications in a plurality of different formats depending on a respective application of the plurality of applications configured to run on the operating system including entering the location in a position corresponding to a content-entry cursor in a foreground running application, wherein the location is entered in a location-specific format that identifies a desired geographic area for the particular application and the format is dependent on the particular application in which the location is entered;

providing a temporary visual confirmation in the position corresponding to the content-entry cursor that the desired geographic area for the particular application and the format is being identified;

causing the formatted location to be transmitted to the particular application for processing according to the desired geographic area; and replacing the temporary visual confirmation in the position corresponding to the content-entry cursor with the formatted location.

18. A non-transitory computer readable medium comprising computer program code, the computer program code being configured to perform at least the following:

provide for use of a location shortcut, at an operating system level for an electronic device, and upon selection of the location shortcut, enable entering a location into a plurality of applications in a plurality of different formats depending on a respective application of the plurality of applications configured to run on the operating system including entering the location in a position corresponding to a content-entry cursor in a foreground running application, wherein the location is entered in a location-specific format that identifies a desired geographic area for the particular application and the format is dependent on the particular application in which the location is entered;

provide a temporary visual confirmation in the position corresponding to the content-entry cursor that the desired geographic area for the particular application and the format is being identified;

cause the formatted location to be transmitted to the particular application for processing according to the desired geographic area; and replace the temporary visual confirmation in the position corresponding to the content-entry cursor with the formatted location.

\* \* \* \* \*